Nov. 30, 1965  W. E. BESSLER  3,220,139

FISHING LURE

Filed June 11, 1964  2 Sheets-Sheet 1

INVENTOR.
WILLIAM E. BESSLER
BY Hamilton & Cook
ATTORNEYS

Nov. 30, 1965 W. E. BESSLER 3,220,139
FISHING LURE
Filed June 11, 1964 2 Sheets-Sheet 2

INVENTOR.
WILLIAM E. BESSLER
BY Hamilton & Cook
ATTORNEYS

United States Patent Office 3,220,139
Patented Nov. 30, 1965

3,220,139
FISHING LURE
William E. Bessler, 4202 Riverview Road,
Peninsula, Ohio
Filed June 11, 1964, Ser. No. 374,403
7 Claims. (Cl. 43—42.02)

The present invention relates generally to fishing lures. More particularly, the present invention relates to a popping type fishing lure. Specifically, the present invention relates to a popping type fishing lure which can be readily assembled by the fisherman from a plurality of interchangeable components in a variety of colors.

Fishing plugs, or lures, of the type defined as "poppers" have long been known and used by fisherman as an excellent surface plug. Such plugs have heretofore been constructed so that a cup-shaped portion thereon would, upon carefully executed sporadic retrieving of the plug, contact the water so as to create, by the turbulence of the engagement, a sound simulating a "pop" which attracts fish to the lure.

These popper type plugs have heretofore been rather cumbersome and bulky because of the necessity for the large water contacting surface required to create the pop. Moreover, their size mitigates against their efficient use with light spinning outfits; increases their subjectivity to tangling with the line; and, decreases the propensity of the fisherman to carry a variety of poppers of different colors, which, it has been found, is desirable since fish are attracted by different colors under different circumstances of lighting, time of day and/or location. Also, poppers known to the prior art are supplied at the factory with one type hook, usually, a treble gang, and are not readily adapted for interchangeability of hook types.

It is therefore an object of the present invention to provide a lure which pops as effectively in the larger sizes for casting as in the smaller sizes for spinning.

It is another object of the present invention to provide a popper type lure, as above, having readily interchangeable components of a variety of colors which can be stored and carried in a minimum amount of space.

It is still another object of the present invention to provide a popper type lure, as above, to which can be selectively attached a variety of interchangeable hook types by a simple manipulation of the lure.

It is a further object of the present invention to provide a popper type lure, as above, which is economical to manufacture and durable in use.

These and other objects which will become apparent from the following specification are accomplished by means hereinafter described and claimed. One preferred embodiment is shown by way of example in the accompanying drawings and described in detail without attempting to show all of the various forms and modifications in which the invention might be embodied; the invention being measured by the appended claims and not by the details of the specification.

Figure 1:
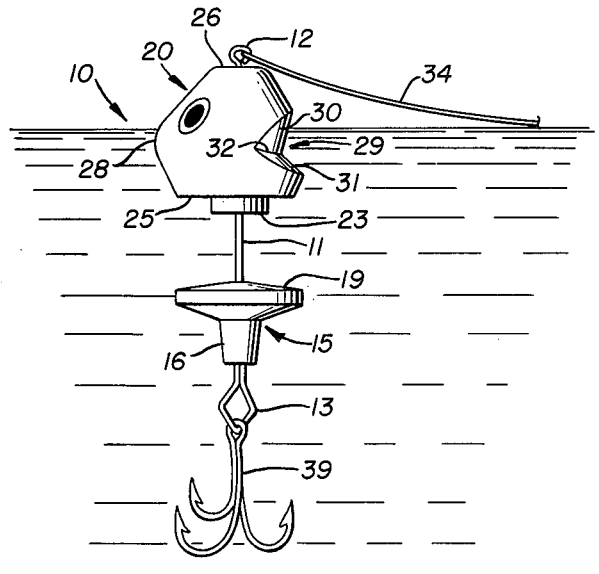
FIG. 1 is a side elevation of a lure constructed according to the present invention depicted in floating position in the water.
Figure 2:
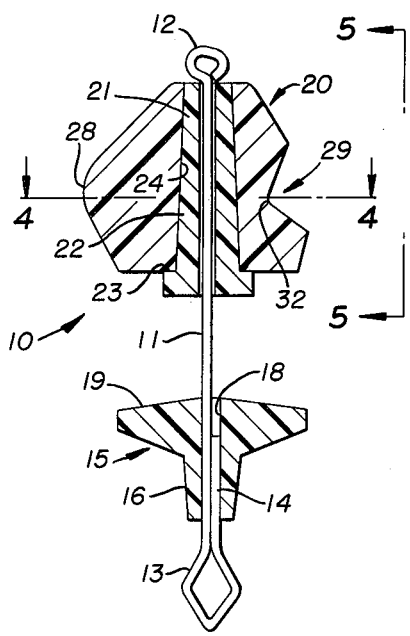
FIG. 2 is an enlarged view similar to FIG. 1 in longitudinal section.

In general a fishing lure according to the present invention is constructed with a straight shaft one end of which terminates in a closed line loop and the other end of which terminates in a selectively openable hook loop which is secured by a locking collar. A head is rotatably and slidably mounted on the shaft between the closed line loop and the locking collar.

Referring more particularly to the drawings, the improved lure is indicated generally by the numeral 10. The basic, or foundation component, is a straight shaft 11, preferably metallic, with a closed line loop 12 at one end and a hook loop 13 at the other end. The hook loop 13 is formed with one end integral with an extending from the main shaft 11 and with a lock extension 14 attached to the other end.

The lock extension 14 is held contiguously against the lower portion of the main shaft 11 by a lock collar 15 to assure retention of a selected hook on the hook loop 13. The lock collar 15 is selectively slidable upwardly along the shaft 11 to release the lock extension 14 when it is desired to change hooks. A bore 18 longitudinally through said lock collar 15 slidingly receives said shaft 11 and is selectively positionable over said lock extension 14 when it is positioned contiguously with said shaft 11.

The lock collar 15 has a downwardly, or rearwardly, conically tapered skirt mounting surface 16 convergent toward said hook loop 13 defining the radially outer surface thereof and is also provided with a radially outwardly directed scud flange 19 on the upper, or forward, end thereof, the purpose of both of which are more fully hereinafter described.

A head 20 is also mounted on the main shaft 11. Head 20 is made of a material having a density of less than 1.0 so it will floatingly support the remainder of the lure and is attached to the main shaft 11 along its longitudinal axis so that it will be free both to rotate around shaft 11 and slide longitudinally therealong.

To provide for ready interchangeability of head 20 a mounting sleeve 21 encircles the upper portion of the main shaft 11. This sleeve 21 is itself rotatable around and slidable along the shaft 11. The radially outer surface 22 of sleeve 21 is also tapered conically convergent toward the line loop 12, i.e. upwardly and away from a radially outwardly directed stop shoulder 23 on the lower end thereof. The radially outer surface 22 of mounting sleeve 21 frictionally engages a conically tapered bore 24 provided longitudinally through the head 20.

So long as the line loop 12 does not extend radially outwardly of the mounting sleeve 21 sufficiently to interfere with the smallest diameter of the conical bore 24 through head 20, the head may be selectively removable from the sleeve 21 for mounting of a similarly shaped head having the desired color.

The head 20 is itself uniquely shaped, preferably being generally bulbous in configuration having a flat table 25 of relatively large diameter at the lower, or rear, end and a smaller diameter culet 26 at the other end. The sides of the head 20 taper outwardly both from the table 25 and culet 26 toward a girdle 28 defining the radially outermost extent of the head 20. The girdle 28 is located in a plane generally transversely of the longitudinal axis of the head 20 and is positioned approximately two-thirds the distance from the culet 26 to the table 25.

The head 20 is also provided with a mouthlike cut 29 defined by opposing upper and lower surfaces 30 and 31 which generally straddle the girdle 28 and intersect interiorly of the head along a somewhat hyperbolic line 32 the ends of which terminate at the girdle 28 and the focus 33 of which lies in a plane spaced rearwardly of and parallel to the plane of the girdle 28.

The mouthlike cut 29 contributes to the necessary orientation of the head 20 while the lure is being retrieved, as is more fully hereinafter described, and the canted inclination of the line 32 assists in providing the necessary axial translation of the head to make the pop, as will also be hereinafter more fully described.

The mouth-like cut 29 properly orients the head in the following manner. It is a general principle of hydraulics that an immeresd body which is free to rotate will assume a position such that its center of gravity and the center of buoyancy will lie in the same vertical line. This is necessary to maintain equilibrium as otherwise the weight of the body, acting through the center of gravity, and the upward buoyant force, acting through the center of buoyancy, form a force couple which will rotate the body. With the head 20 mounted on the shaft 11 and with no exterior force applied to the lure the center of gravity of the entire lure will move to a position below the center of buoyancy by the action of this force couple, and when the center of gravity is aligned with and beneath the center of buoyancy the entire lure will be in a position of stable equilibrium, as shown in FIG. 1.

Now, as the fisherman applies a retrieving force to the line 34 this force will counter and exceed the rotative force couple of the forces applied to the center of gravity and the center of buoyancy of the lure. At this point the freely rotatable and slidable head 20 will itself be subject to a variety of forces.

The free slidability of the head 20 along the shaft 11 will have caused the head 20 to position as far forward along the shaft 11 as possible i.e., contiguously with the line loop 12. However, the center of gravity of the head 20 will be superseded by the much greater downward component of the retrieving force applied to the line 34, this component being applied downwardly from the shaft 11.

Figure 3:
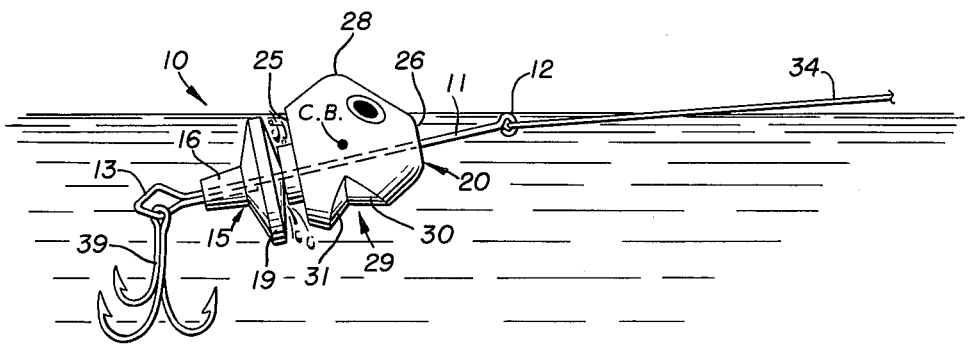
FIG. 3 is a side elevation of the lure as the fisherman retrieves it, depicting the lure at the end of the noise-making surge.
Figure 4:
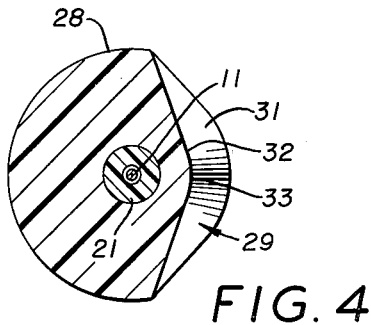
FIG. 4 is a cross section taken substantially on line 4—4 of FIG. 2.
Figure 5:
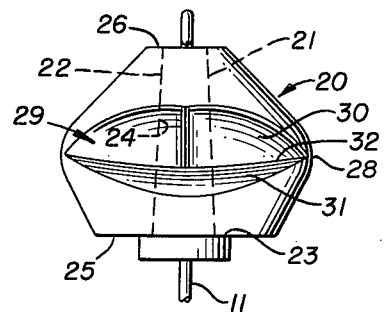
FIG. 5 is a partial side elevation taken substantially on line 5—5 of FIG. 2.
Figure 7:
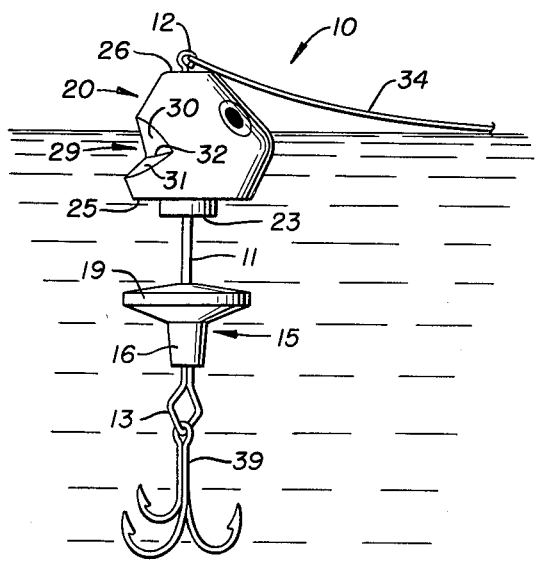
FIG. 7 is a view similar to FIG. 1 with the head positioned oppositely to the position depicted in FIG. 1.
Figure 8:
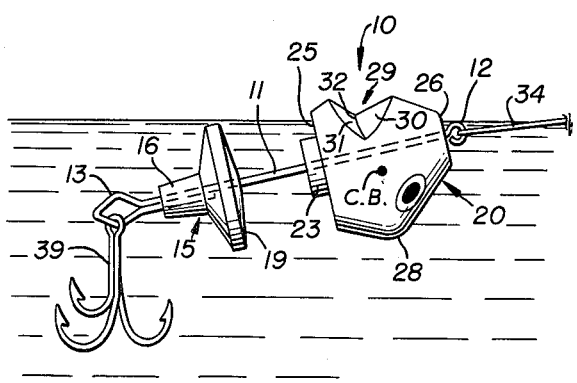
FIG. 8 is a side elevation of the lure tilted from the position shown in FIG. 7.

Thus, the head 20, during retrieving of the line, will only be in a position of stable rotative equilibrium when the center of buoyancy of the head 20 lies in the same vertical plane as, and above, the shaft 11. Accordingly, when the lure is tipped from the position depicted in FIG. 1 to the position of FIG. 3, the head will retain the orientation shown because the center of buoyancy, in FIG. 3, is vertically above the shaft 11. However, as the line is tipped from the position shown in FIG. 7 to the position of FIG. 8, the center of buoyancy (c.b.) will lie below the shaft 11 and the upward force of the buoyant effect of the water which acts therethrough will apply a rotative moment to the head until the center of buoyancy lies above the shaft, thus rotating the head 20 from the position depicted in FIG. 8 to that of FIG. 3.

The application of a further retrieving force to line 34 moves the shaft axially through the head 20. The head 20 tends to resist free movement with the axially displaced shaft 11 because the lower surface 31 of the mouthlike cut 29 lies generally transversely the direction in which the shaft 11 is pulled by the retrieving force applied by line 34. Moreover, the preferably canted inclination of the intersecting line 32 channels the water flow along the surface 31 from both sides of the cut at the girdle toward the central portion so that the position of the head 20 is maintained in its proper orientation against the force applied by the resistance of the flowing water thereagainst.

With the head thus restrained the scud flange 19 on collar 15 is moved forcefully toward the table portion 25 of the head 20 causing severe turbulence in the water therebetween which occurs simultaneously with the popping noise made as the scud flange 19 engages the underside of the stop shoulder 23 on the mounting sleeve 21.

Figure 6:
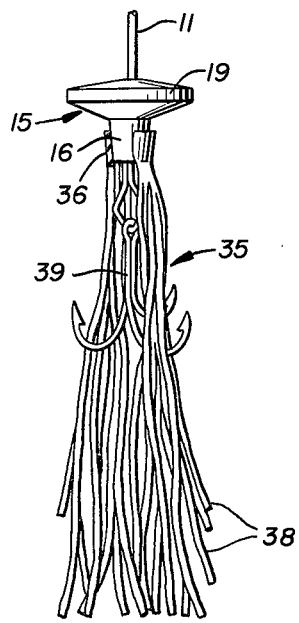
FIG. 6 is a partial side elevation, partly broken away, depicting an interchangeable skirt mounted on the lock collar.

As best shown in FIG. 6, a skirt 35 having a waistband 36 frictionally mountable on the tapered mounting surface 16 on the lock collar 15 may have trailing strands 38 of any desired shape, color or design as to attract fish.

The fisherman using the lure 10 may be supplied with a variety of skirts 35 and heads 20, in desired patterns or colors which can be interchanged by the fisherman at will. Similarly, the fisherman can attach a single hook, a treble gang hook 39 (as shown) or a weedless hook at his pleasure. Moreover, with the head 20 both slidably and rotatably mounted on the shaft 11, the propensity for fouling by induced rotation of the entire lure is eliminated.

It should thus be apparent that a lure constructed according to the concept of the present invention accomplishes the objects thereof.

What is claimed is:

1. A fishing lure comprising, a main shaft, a line loop at one end of said shaft, a hook loop at the other end of said shaft, a scud flange mounted on said shaft, a mounting sleeve rotatably and slidably mounted on said shaft between said scud flange and said line loop, an outer surface on said mounting sleeve tapered conically convergent toward said line loop, a floatable head, said head having a generally bulbous body with a relatively large table at the rearmost end and a smaller culet at the foremost end, the size of said head diverging outwardly from both the table and the culet to a girdle defining the radially outermost extent of said head body, a mouthlike cut on said head body, said cut generally straddling said girdle, a bore longitudinally through said head from said table to said culet, said bore being conically tapered for mating engagement with said mounting sleeve.

2. A fishing lure, as set forth in claim 1, in which said mouth-like cut is defined by upper and lower surfaces intersecting along a somewhat hyperbolic line.

3. A fishing lure, as set forth in claim 2, in which the ends of the hyperbolic line intersects the girdle and the vertex lies in a plane parallel to and axially rearwardly of the plane of said girdle.

4. A fishing lure comprising, a main shaft, a line loop at one end of said shaft, a hook loop at the other end of said shaft, one end of said hook loop joining said shaft, the other end of said hoop loop having a lock extension movable into and away from generally contiguous contact with said shaft, a lock collar, said lock collar having a body with a longitudinal bore therethrough in which said shaft is axially slidable, said bore selectively positionable over said lock extension when said lock extension is contiguous with said shaft, a scud flange extending radially outwardly of said collar, a mounting sleeve rotatably and slidably mounted on said shaft between said flange and said line loop, an outer surface on said mounting sleeve tapered conically convergent toward said line loop, a floatable head, said head having a conical longitudinal bore therethrough, said bore being conically tapered for mating engagement with the outer surface on said mounting sleeve, a cut on said head having a surface oriented generally transversely of said shaft to contact the water when said shaft is pulled through the water by application of a retrieving force to said line loop.

5. A fishing lure, as set forth in claim 4, in which the lock collar has a body portion with a conically tapered surface convergent away from said scud flange toward said hook loop, a skirt, said skirt having a waistband frictionally engaging the tapered surface on said collar.

6. A fishing lure, as set forth in claim 5, in which the head has a generally bulbous body with a relatively large table at the rearmost end and a smaller culet at the foremost end, the sides of said body diverging outwardly from both the table and the culet to a girdle defining the radially outermost extent of said head body, said mouthlike cut on said body generally straddling said girdle.

7. A fishing lure comprising, a main shaft, a line loop at one end of said shaft, a hook loop at the other end of said shaft, a scud flange mounted on said shaft, a mounting sleeve rotatably and slidably mounted on said shaft between said scud flange and said line loop and having a radially directed stop shoulder adjacent said scud flange, the radially outer surface of said sleeve being tapered conically convergent toward said line loop upwardly and away from said stop shoulder, and a selectively removable floating head, said head having a longitudinally extending conically tapered bore which frictionally engages the outer surface of said sleeve when the lower portion of said head is against the stop shoulder of said sleeve, the smallest diameter of the bore through said head being sufficient for the line loop on said shaft to pass therethrough, and said head having a generally bulbous body with a relatively large table at the rearmost end and a cutlet at the foremost end, the size of said head diverging outwardly from both the table and the cutlet to a girdle defining the radially outermost extent of said head.

References Cited by the Examiner
UNITED STATES PATENTS

| | | | |
|---|---|---|---|
| 667,257 | 2/1901 | Shakespeare | 43—42.36 X |
| 1,193,077 | 8/1916 | Schoonmaker | 43—42.45 |
| 2,036,954 | 4/1936 | Murray | 43—42.48 X |
| 2,111,020 | 3/1938 | Arbogast | 43—42.2 X |
| 2,578,041 | 12/1951 | Candioto | 43—42.21 |
| 2,992,508 | 7/1961 | Schmidt | 43—44.91 |
| 3,108,390 | 10/1963 | Knight | 43—42.09 |

SAMUEL KOREN, *Primary Examiner.*

R. L. HOLLISTER, *Assistant Examiner.*